United States Patent
Takizawa et al.

(10) Patent No.: US 7,139,050 B2
(45) Date of Patent: Nov. 21, 2006

(54) SUBSTRATE FOR ELECTRO-OPTICAL DEVICE, ELECTRO-OPTICAL DEVICE, ELECTRONIC APPARATUS, AND METHOD FOR MANUFACTURING ELECTRO-OPTICAL DEVICE

(75) Inventors: Keiji Takizawa, Hotoka-machi (JP); Toshinori Uehara, Matsumoto (JP); Tomoyuki Nakano, Toyoshima-machi (JP)

(73) Assignee: Seiko Epson Corporation (JP)

( * ) Notice: Subject to any disclaimer, the term of this patent is extended or adjusted under 35 U.S.C. 154(b) by 89 days.

(21) Appl. No.: 10/840,795

(22) Filed: May 6, 2004

(65) Prior Publication Data
US 2004/0257505 A1   Dec. 23, 2004

(30) Foreign Application Priority Data
May 6, 2003   (JP)   ............................. 2003-128082
Mar. 10, 2004   (JP)   ............................. 2004-067243

(51) Int. Cl.
G02F 1/1335   (2006.01)
(52) U.S. Cl. ...................................... 349/106; 349/138
(58) Field of Classification Search ................. 349/106
See application file for complete search history.

(56) References Cited

U.S. PATENT DOCUMENTS

| | | | | |
|---|---|---|---|---|
| 5,666,177 | A | * | 9/1997 | Hsieh et al. ................ 349/111 |
| 6,016,178 | A | * | 1/2000 | Kataoka et al. ............. 349/117 |
| 6,597,421 | B1 | | 7/2003 | Hatanaka et al. |
| 6,947,106 | B1 | * | 9/2005 | Chang et al. ................ 349/106 |

FOREIGN PATENT DOCUMENTS

| | | |
|---|---|---|
| CN | 1300954 A | 6/2001 |
| JP | 2000-347182 | 12/2000 |

* cited by examiner

*Primary Examiner*—Andrew Schechter
*Assistant Examiner*—Richard Kim
(74) *Attorney, Agent, or Firm*—Harness, Dickey & Pierce, P.L.C.

(57) ABSTRACT

An electro-optical device according to the present invention comprises an electro-optical layer, a pair of electrodes facing each other with the electro-optical layer interposed therebetween, and a metal layer and a plurality of layers laminated on the metal layer which are arrange toward the electro-optical layer on a substrate provided on one side of the electro-optical layer, wherein an outer periphery of the metal layer is covered by a first layer of the plurality of layers which is initially formed.

18 Claims, 12 Drawing Sheets

SUBSTRATE FOR ELECTRO-OPTICAL DEVICE, ELECTRO-OPTICAL DEVICE, ELECTRONIC APPARATUS, AND METHOD FOR MANUFACTURING ELECTRO-OPTICAL DEVICE

RELATED APPLICATIONS

This application claims priority to Japanese Patent Application Nos. 2003-128082 filed May 6, 2003 and 2004-067243 filed Mar. 10, 2004 which are herby expressly incorporated by reference herein in their entirety.

BACKGROUND

1. Field of the Invention

The present invention relates to a substrate for an electro-optical device, an electro-optical device and an electronic device, and a method for manufacturing the electronic device, and more specifically, to the construction of an electro-optical device in which a metal layer is provided on a substrate.

2. Description of the Related Art

In general, in various electro-optical devices, such as a liquid crystal display device, an organic electro-luminescent device, and a plasma display device, a pair of electrodes is opposite to each other with an electro-optical layer interposed therebetween, and a substrate is provided on at least one side of the electro-optical layer. A liquid crystal display device, which is an example of an electro-optical device, usually has a panel in which electrodes are formed on the inner surfaces of a pair of substrates, the pair of substrates is bonded to each other by a sealing material, and liquid crystal is injected in a space surrounded by the pair of substrates and the sealing material.

There are two reflecting types of liquid crystal display devices: one is a reflective liquid crystal display device, and the other is a transflective liquid crystal display device, both having a reflective plate or reflective layer. As this type of device, a device in which a reflective layer is disposed on the external side of a substrate is used. However, in this case, since light passes through a substrate two times and is then visually recognized, display quality deteriorates due to parallax caused by the path of light. Therefore, it is common that an internal reflection type device having a reflective layer on the inner surface of the substrate is mainly manufactured.

In the internal reflection type liquid crystal display device, the reflective layer is formed by depositing a metal material, such as aluminum, an aluminum alloy, a silver alloy, or a chromium alloy, on the substrate using an evaporation method or a sputtering method. In the case of color liquid crystal display devices, color filters have a construction in which colored layers are provided on the reflective layer. In this case, there has been known a method of preventing the reflective layer from damaging by covering the reflective layer with the colored layers and by forming the reflective layer within the boundary narrower than that of the colored layers.

An example of the transflective liquid crystal display device will be described with reference to FIG. 16. A liquid crystal display device 200 has a construction in which a liquid crystal layer 235 is provided between a first substrate 210 and a second substrate 220. In the first substrate 210, a transparent base layer 212, a reflective layer 213, colored layers 214F and 214C, a protective layer 215, a transparent electrode 216, and an alignment film 217 are formed in order on a substrate 211. In the second substrate 220, a transparent electrode 222 and an alignment film is formed in order on a substrate 221. An opening 213a is formed corresponding to every pixel P in the reflective layer 213. A light transmission region Pt is formed of the opening 213a, and a light reflection region Pr is formed of regions other than the light transmission region Pt. A light-shielding layer 214 is formed between pixels. According to the liquid crystal display device, it is possible to make the liquid crystal layer 235 thicker in the light transmission region Pt and to make the liquid crystal layer 235 thinner in the light reflection region Pr only by patterning the protective layer 215. Also, according to the conventional embodiment illustrated in FIG. 16, it is possible to reduce the difference of display quality between transmissive display and reflective display by making the optical density of the colored layer 214C in the light transmission region Pt larger and the optical density of the colored layer 214F in the light reflection region Pr smaller.

FIG. 17(a) is an enlarged cross-sectional view illustrating the construction of a part of the peripheral region provided on the outside of a display region in which a pixel P is arranged in the first substrate 210 of the liquid crystal display device 200.

In the peripheral region, a light-shielding layer 214BM is formed by laminating a red colored layer 214R and a blue colored layer 214B in order. The light-shielding layer 214BM is covered with a protective layer, on which a wiring line 218 to be connected to the transparent electrode 216 is arranged. An outer periphery 213e of the reflective layer 213 is provided under the light-shielding layer 214BM.

However, the liquid crystal display device 200 may have a defect in display in that the outer periphery 213e of the reflective layer 213 lifts together with the light-shielding layer 214BM to disconnect the wiring line 218 as illustrated FIG. 17(b) when the reflective layer 213, the colored layers 214B, 214R, and 214G, the protective layer 215, the electrode 216, and the wiring line 218 are formed in this order. Such a defect in display occurs even when the reflective layer is formed to be narrower then the colored layer, resulting in a reduction of yield.

Accordingly, the present invention is designed to solve the above problems, and it is an object of the present invention to provide a substrate for an electro-optical device and the construction of the electro-optical device capable of reducing a defect in display due to the disconnection of wiring lines and of improving the yield of product by preventing the lifting of the outer periphery of metal layer.

SUMMARY

The following is provided to solve the above problem. An aqueous alkali solution, in which a solute, such as sodium carbonate or calcium hydroxide, is dissolved, is used as a developer when colored layers constituting color filters are patterned. At that time, the developer may permeate between the outer periphery 213e of the reflective layer 213 and the substrate 211. When the reflective layer 213 is formed of a material, such as aluminum, especially weak to alkali, a part of the reflective layer 213 may be eroded to cause the outer periphery 211 of the reflective layer 213 peeling off. Then, in the next heating process, such as a process of baking the colored layers or a process of heating the transparent electrode 216, since the peeled-off outer periphery of the reflective layer may bend and lift, it is possible to generate the break of the transparent electrode 216. Since this phenomenon may gradually develop by repeating temperature up and down control during the manufacturing process and it is frequently found during the latter part of manufacturing processes, it becomes one of the reasons to decrease manufacturing efficiency.

Considering these conditions, the inventors had an inference that the outer periphery of reflective layer 213 may be covered before the patterning process of the colored layer in order to prevent the permeation of a material, such as a developer. As a result of consideration and experiments, the inventors achieved good performance to result in the present invention.

That is, according to the present invention, there is provided a substrate for an electro-optical device comprising: on the substrate, a metal layer; and a plurality of layers laminated on the metal layer, wherein an outer periphery of the metal layer is covered with a first layer of the plurality of layers which is initially formed.

When the plurality of layers is formed on the metal layer, a patterning process or a heating process is performed on the respective layers. Therefore, the substrate and the metal layer on the substrate may be influenced by the permeation of a developer and an etchant, and heat stress. However, in the present invention, since the outer periphery of the metal layer is covered by the first layer of the plurality of layers which is initially formed, a patterning process or a heating process rarely has an influence on the first layer or other layers formed after the first layer. Therefore, the outer periphery of the metal layer is not peeled and lifted (bent) from the substrate. As a result, it is possible to decrease the defects of the devices, and to increase the yield of product.

It is not necessary to provide the plurality of layers only on the metal layer. That is, the first layer may be provided in a region that is initially formed, and layers other than the first layer may be provided in other regions. Also, the plurality of layer includes a variety of layers, such as an insulating layer, a colored layer, a conductive layer, and an alignment film.

A substrate for an electro-optical device according to another aspect of the present invention is a substrate for an electro-optical device comprising: on the substrate, a metal layer; and a plurality of layers laminated on the metal layer, wherein an outer periphery of the metal layer is covered with a first layer of the plurality of layers which is directly formed on the metal layer.

In the same manner, the outer periphery of the metal layer is covered with the first layer which is directly formed on the metal layer. Since it is possible to prevent a developer or an etchant from permeating into the outer periphery during the patterning process, the outer periphery of the metal layer is not lifted (bent) from the substrate. Therefore, it is possible to decrease the defects of the devices, and to increase the yield.

It is preferable that the plurality of layers be laminated on the metal layer so as to be partly overlapped with each other. The first layer may be the lowest layer among the plurality of layers. In addition, the plurality of layers includes a variety of layers, such as an insulating layer, a colored layer, a conductor layer, and an alignment film.

According to the present invention, it is preferable that the first layer be arranged to extend at least 1 µm beyond the outer periphery of the metal layer. In this construction, since the first layer covering the outer periphery of the metal layer is arranged to extend at least 1 µm beyond and continuously from the outer periphery of the metal layer, it is possible to securely prevent a developer or an etchant from permeating thereinto. In order to make the substrate smaller, it is preferable that the distance between the outer periphery of the metal layer and the outer periphery of the first layer be within the range of about 1 to 10 µm, especially within the range of about 3 to 8 µm in case of considering the patterning accuracy.

According to the present invention, it is preferable that the plurality of layers be colored layers of a plurality of colors. Since the outer periphery of the metal layer is covered with a first layer initially formed among the plurality of colored layers with the plurality of colors, or the first layer directly formed on the metal layer among the plurality of colored layers with the plurality of colors laminated on the metal layer, the outer periphery of the metal layer is already covered before patterning the plurality of colored layers with the plurality of colors including the first layer. This construction makes it possible to prevent peeling-off and lifting (bending) of the outer periphery. When the colored layers are formed with a photosensitive colored resin by a photolithography process, since it is necessary to perform a developing process using an aqueous alkali solution and a baking process after developing, it is easily predictable that the outer periphery of the metal layer may peel and lift. Therefore, the construction according to the present invention is especially effective to prevent those phenomena. In this construction, although the first layer is the colored layer initially formed among the plurality of colored layers with the plurality of colors which forms the color filter itself, it is also preferable that any layer, including a light-shielding layer, initially formed on the metal layer should be the first layer in a case in which the light-shielding layer is formed with another material, such as black resin, if excluding the plurality of colored layers with the plurality of colors which forms the color filter itself.

Also, in case of forming the plurality of colored layers with the plurality of colors, it is preferable that the first layer be the thickest layer among the plurality of colored layers. By this construction, it is possible to further decrease the permeation of a developer or an etchant into the outer periphery of the metal layer.

According to the present invention, it is preferable that the first layer constitute a light-shielding layer for shielding light which is formed on the outer periphery of the metal layer. It is conventional that the outer periphery of the metal layer is provided in the periphery region formed on the outside of the display region. The light-shielding layer is formed on the outer periphery of the metal layer. On condition that the light-shielding layer itself is the first layer, the outer periphery of the metal layer is securely protected by the light-shielding layer. In addition, on condition that the light-shielding layer is formed by laminating the plurality of layers, the outer periphery of the metal layer is securely protected by the first layer initially formed or the first layer directly formed on the metal layer.

There is a case in which the light-shielding layer is formed by laminating the plurality of layers. In this construction, the light-shielding layer comprises the second layer on the first layer. It is especially preferable that the positions of the outer periphery of the first and the second layer be different from each other. By the construction, since the thickness of the light-shielding layer decreases gradually toward the outside, it is possible to decrease the step difference of the wiring lines and the inclined angle of the surface. As a result, it is possible to prevent the disconnection of the wiring lines caused by the insufficient step coverage. Further, in case of a complex layer, such as the light-shielding layer, which is formed of the plurality of layers to perform an independent function, it is preferable that any one of the plurality of layers constituting the complex layer cover the outer periphery of the metal layer.

It is preferable that the present invention further comprise a display region in which a plurality of pixels is arranged, and a peripheral region arranged on the outside of the display region, wherein the outer periphery of the metal layer and the light-shielding layer are provided in the peripheral region, and the wiring lines are arranged above the light-shielding layer. In the construction, it is possible to prevent the wiring lines from breaking by the peeling-off and lifting of the outer periphery of the metal layer. As a result, it is possible to prevent display defects caused by the breaking of the wiring lines.

Also, an electro-optical device according to the present invention is an electro-optical device comprising: an electro-optical layer; a pair of electrodes facing each other with the electro-optical layer interposed therebetween; and a metal layer and a plurality of layers laminated on the metal layer which are arranged toward the electro-optical layer on a substrate provided on one side of the electro-optical layer, wherein the outer periphery of the metal layer is covered with a first layer of the plurality of layers which is initially formed. By this construction, since it is possible to prevent peeling-off and lifting of the outer periphery of the metal layer, it is possible to reduce the defects of the devices, and to increase the yield of products.

In addition, another electro-optical device according to the present invention is an electro-optical device comprising: an electro-optical layer; a pair of electrodes facing each other with the electro-optical layer interposed therebetween; and a metal layer and a plurality of layers laminated on the metal layer which are arranged toward the electro-optical layer on a substrate provided on one side of the electro-optical layer, wherein an outer periphery of the metal layer is covered by a first layer of the plurality of layers which is directly formed on the metal layer. Furthermore, by this construction, since it is possible to prevent peeling-off and lifting of the outer periphery of the metal layer, it is possible to decrease the defects of the devices, and to increase the yield of products.

According to the present invention, it is preferable that the outer periphery of the first layer be arranged to extend at least 1 μm beyond the outer periphery of the metal layer. Since the first layer covering the outer periphery of the metal layer is arranged to extend at least 1 μm beyond and continuously from the outer periphery of the metal layer, it is possible to securely prevent the permeation of a developer or an etchant. In order to make the substrate smaller, it is preferable that the distance between the outer periphery of the metal layer and the outer periphery of the first layer be within the range of about 1 to 10 μm, especially within the range of about 3 to 8 μm in case of considering the patterning accuracy.

According to the present invention, it is preferable that color filters including the plurality of colored layers be provided, and the plurality of layers is the plurality of colored layers. Since the outer periphery of the metal layer is covered by the first layer initially formed among the plurality of colored layers with the plurality of colors, or the first layer directly formed on the metal layer among the plurality of colored layers with the plurality of colors laminated on the metal layer, the outer periphery of the metal layer is already covered before patterning the plurality of colored layers with the plurality of colors including the first layer. This construction makes it possible to prevent peeling-off and lifting (bending) of the outer periphery of the metal layer. When the colored layers are formed with a photosensitive colored resin by a photolithography method, since it is necessary to do developing with an aqueous alkali solution and baking after developing, it is easily predictable that the outer periphery of the metal layer may peel and lift. Therefore, the construction according to the present invention is especially effective to prevent those phenomena. In the construction, although the first layer is a colored layer initially formed among the plurality of colored layers with the plurality of colors which forms the color filter itself, it is also preferable that any layer, including the light-shielding layer, initially formed on the metal layer be the first layer in a case in which the light-shielding layer is formed with a material, such as black resin, if excluding the plurality of colored layers with the plurality of colors which forms the color filter itself.

According to the present invention, the electro-optical device preferably comprise a display region in which a plurality of pixels is arranged, and a peripheral region arranged on the outside of the display region, wherein the outer periphery of the metal layer and the first layer are provided in the peripheral region, and the first layer constitutes a light-shielding layer for shielding light which is provided on the outer periphery of the metal layer. It is especially effective in a case in which the wiring lines are provided above the light-shielding layer. Further, in case of a complex layer, such as the light-shielding layer, which is formed of the plurality of layers to perform an independent function, it is preferable that any one of the plurality of layers constituting the complex layer cover the outer periphery of the metal layer.

According to the present invention, the light-shielding layer preferably comprises a second layer on the first layer, wherein an outer periphery position of the first layer and an outer periphery position of the second layer are different from each other. By the construction, it is possible to decrease the step difference of the surface or the inclined angle of the surface. As a result, it is possible to lower the probability of line breaking defects in a case in which the wiring lines are provided on the upper layer of the light-shielding layer.

Also, an electronic apparatus according to the present invention comprises the electro-optical device according to any one of the aforementioned embodiments and control means of the electro-optical device. By the reason as described above, it is possible to reduce the defect ratio of the electro-optical device and to raise the yield. Therefore, it is possible to supply and constitute an electronic apparatus at a low price and with high reliability.

Next, according to the present invention, there is provided a method for manufacturing an electro-optical device comprising: an electro-optical layer; a pair of electrodes facing each other with the electro-optical layer interposed therebetween; and a metal layer and a plurality of layers laminated on the metal layer which are arranged toward the electro-optical layer on a substrate provided on one side of the electro-optical layer, the method comprising the steps of: forming the metal layer on the substrate; initially forming a first layer of the plurality of layers on the metal layer so as to cover an outer periphery of the metal layer; and forming the remaining plurality of layers other than the first layer. By the construction, since it is possible to prevent peeling-off and lifting (bending) of the outer periphery of the metal layer, it is possible to decrease the defects of the devices, and to increase the yield of products. In addition, it is possible to remarkably increase manufacturing efficiency of the entire production line because the defects inspected in the latter processes of the production line are especially reduced.

According to the present invention, it is preferable that the electro-optical device be provided with a color filter including the colored layers with the plurality of colors, and that the plurality of layers be the colored layers of the plurality of colors. When the colored layers are formed on the metal layer, since it is necessary to do developing with an aqueous alkali solution and baking after developing, it is easily predictable that the outer periphery of the metal layer may peel and lift (bend). Therefore, the construction according to the present invention is especially effective to prevent those phenomena.

Further, according to the present invention, there is provided an electro-optical device comprising: an electro-optical layer; a pair of electrodes facing each other with the electro-optical layer interposed therebetween; a color filter composed of a metal layer and a plurality of colored layers laminated on the metal layer which are arranged toward the electro-optical layer on a substrate provided on one side of the electro-optical layer; a display region in which a plurality of pixels is arranged; and a peripheral region arranged on the outside of the display region, wherein an outer periphery of the metal layer and the plurality of colored layers are arranged in the peripheral region, wherein the plurality of colored layers constitute a light-shielding layer for shielding light, and wherein the outer periphery of the metal layer is covered with any one of the plurality of layers.

According to the present invention, since the outer periphery of the metal layer is covered by any one of the plurality of layers constituting the light-shielding layer, it is possible to prevent peeling-off and lifting (bending) of the metal layer caused by the latter processes of patterning other layers formed additionally on the light-shielding layer.

DETAILED DESCRIPTION

Next, preferred embodiments of a substrate for an electro-optical device, an electro-optical device and an electronic apparatus, and a method for manufacturing the electro-optical device will be described with reference to the accompanying drawings. Although each embodiment, which will be illustrated below, relates to a liquid crystal device as one of the electro-optical devices, the present invention is applied not only to the liquid crystal device but also to electro-optical devices, such as an electro-luminescent device, a plasma display device, and a field emission display device.

Overall Construction of Liquid Crystal Display

Figure 7:
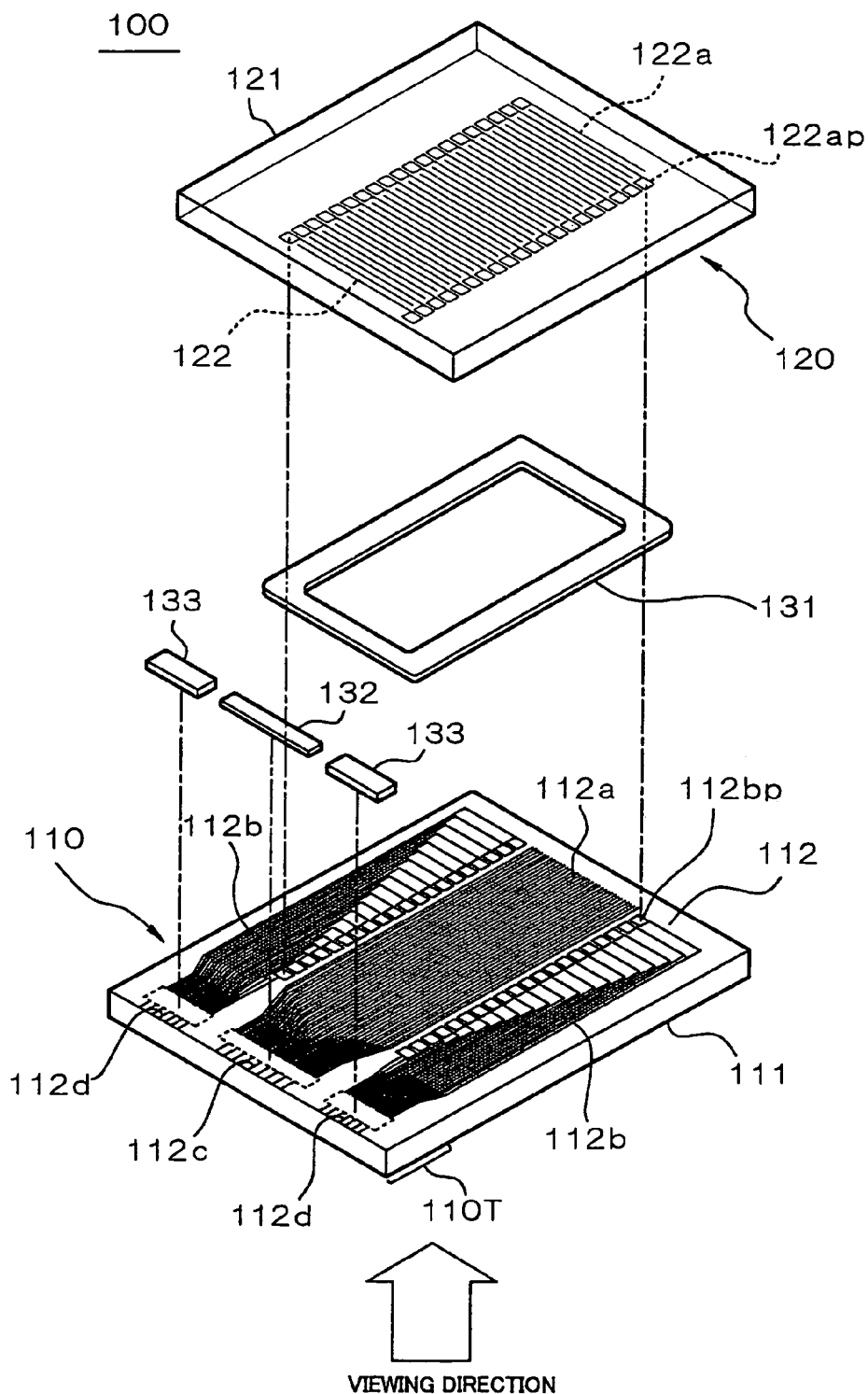
FIG. 7 is an exploded perspective view schematically illustrating the entire construction of a liquid crystal device according to the present embodiment.
Figure 8:
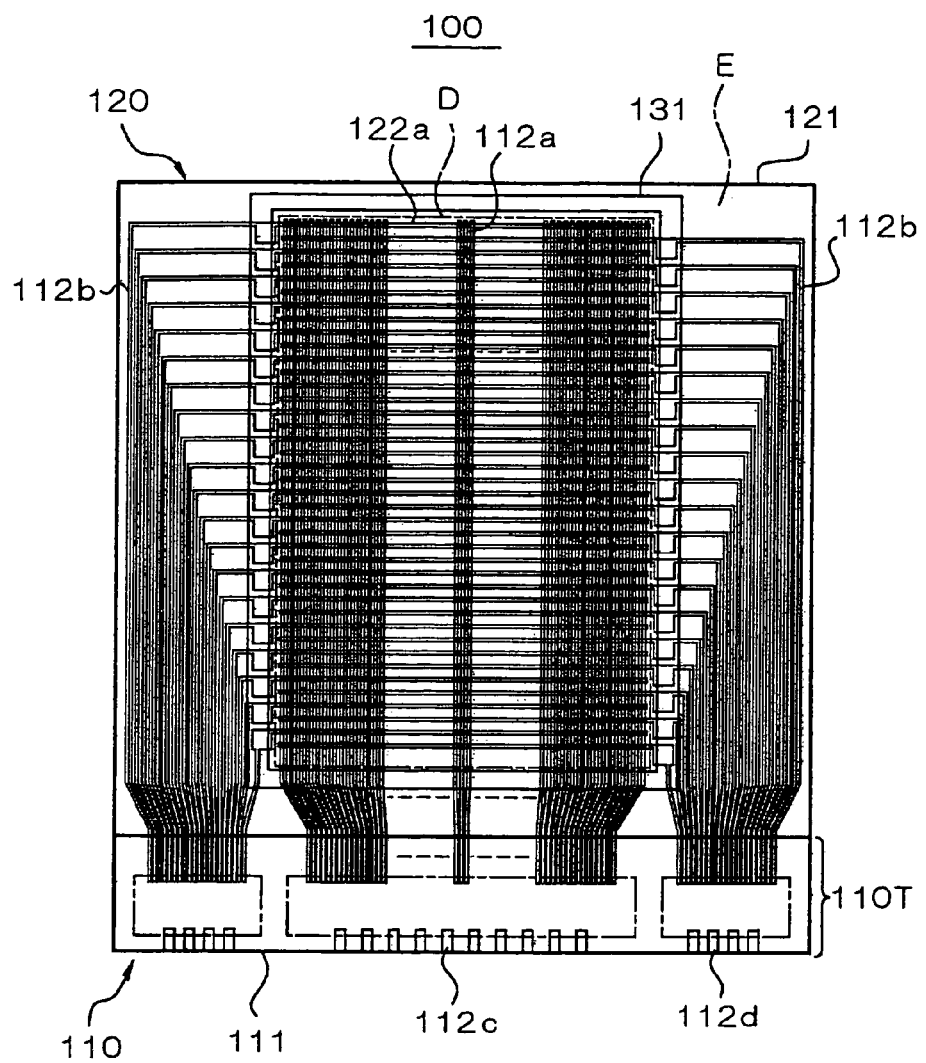
FIG. 8 is a schematic plan view perspectively illustrating the liquid crystal device according to present embodiment.

First of all, the entire construction of a liquid crystal device 100 will be explained. FIG. 7 is an exploded perspective view of the liquid crystal device 100, and FIG. 8 is a plan perspective view of the liquid crystal 100. The liquid crystal device 100 has a construction in which a first substrate 110 and a second substrate 120 are bonded by a sealing material 131. Liquid crystal (not shown), which functions as an electro-optical material, is injected in the space surrounded by the first substrate 110, the second substrate 120, and the sealing material 14. The first substrate 110 has a protruding part 110T that protrudes from the edge of the second substrate 120. Electronic parts (semiconductor IC chips) 132 and 133 having circuits, such as liquid crystal driving circuits, built therein are mounted on the surface of the protruding part 110T. A plurality of terminals (not shown) of the electronic parts 132 and 133 are electrically connected to electrode wiring lines 112a, wiring lines 112b, and input terminals 112c and 112d, which are respectively provided on the surface of the protruding part 110T.

In the first substrate 110, a conductor pattern 112 composed of ITO is formed on the surface of the substrate 111 composed of a transparent material, such as glass or plastic. In the conductor pattern 112, the electrode wiring lines 112a in a stripe shape is included in a display region (see FIG. 8) formed in the inner side of the sealing material 131. These electrode wiring lines 112a are connected to driving elements (for instance, TFDs (Thin Film Diodes)), which are not illustrated in the drawing. The electrode wiring lines 112a are extended from the display region D to the surface of the protruding part 110T. In addition, a periphery region E (see FIG. 8) is provided in the outside of the display region D. In the periphery region E, a plurality of the wiring lines 112b is provided on the substrate 111. In these wiring lines 112b, the connecting pad part 112bp is provided along the boundary with the display region D.

Further, an end of the wiring lines 112b opposite to the connecting pad part 112bp is extended to the protruding part 110T. Furthermore, the plurality of input terminals 112c and 112*d* is formed in the vicinity of the edge of the protruding part 110T. It is possible that these input terminals 112*c* and 112*d* to be connected to a wiring member (not shown), such as a flexible PCB, may receive control signals and display data from display control means placed outside.

On the other hand, in the second substrate 120, the conductor pattern 122 composed of a material, such as ITO, is formed on the surface (the inner side opposite to the first substrate 110) of the substrate 121 formed of a material, such as glass or plastic. A plurality of stripe-shaped conductors 122*a* is provided in the conductor pattern 122. At the ends of these stripe conductors 122*a*, the connecting pads 122*ap* are respectively formed. The stripe conductors 122*a* are extended in a direction perpendicular to the extending direction of the electrode wiring lines 112*a* on the first substrate 110.

Figure 9:
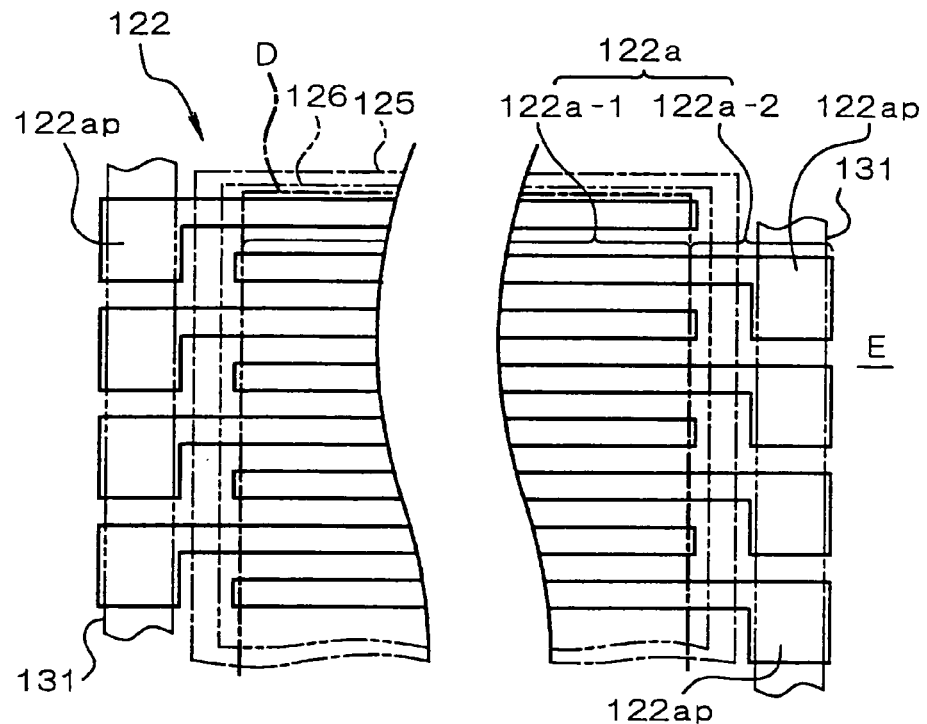
FIG. 9 is a plan view enlarging a part of the conductor pattern on the second substrate according to the present embodiment.

FIG. 9 is a plan view schematically enlarging the vicinity of both ends of the stripe conductors 122*a* provided on the second substrate 120. A part of the stripe conductor 122*a* placed within the display region D becomes an electrode 122*a*-1, and the electrode 122*a*-2 integrally formed with the electrode 122*a*-1 extends outwardly from the peripheral region E. The connecting pad part 122*ap* is formed with wider width on the external end of the wiring line 122*a*-2. From now, when explaining about the construction of the wiring line 122*a*-2 and it's vicinity, a direction to the display region D will be described as the inside, and a direction to the peripheral region E, or further, a direction toward the outer periphery will be described as the outside.

Figure 10:
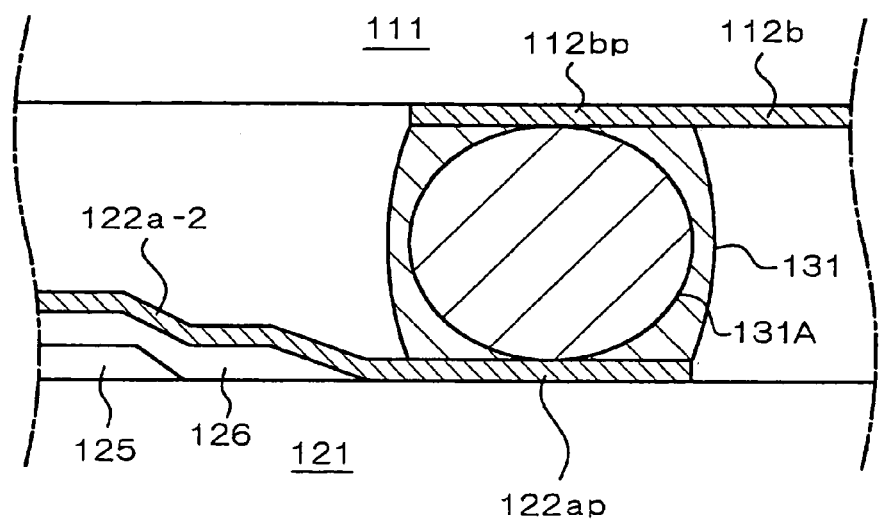
FIG. 10 is a cross-sectional view enlarging a vertical conduction part according to the present embodiment.

As illustrated in the FIG. 10, the connecting pad part 122*ap* of the stripe conductor 122*a* is connected to the connecting pad part 112*bp* of the wiring line 112*b* through the sealing material 131 interposed therebetween. The sealing material 131 consists of resin as a main material and a lot of fine conductive particles 131A dispersed in the resin. Although, in FIG. 10, the width of the sealing material 131 is illustrated as almost same as the diameter of the conductive particle 131A, the external diameter of the conductive particle 131A is about 5 to 10 µm, and the width of the sealing material 131 is about 0.1 to 3.0 mm in actual size. When the first substrate 110 and the second substrate 120 are bonded with each other by the sealing material 131 interposed therebetween and the sealing material 131 is hardened under pressure, these conductive particles 131A play a role to electrically connect the connecting pad parts 121*bp* to the connecting pad parts 122*ap*. In more detail, since the sealing material 131 constructed as described above has conductive anisotropy, the plurality of connecting pad parts 112*bp* and the connecting pad parts 122*ap* are electrically connected to each other with the sealing material 131 interposed therebetween.

In this embodiment, as described above, in the second substrate 120, the connecting pad parts 122*ap* are provided at the ends of the wiring lines 122*a*-2, and this connecting pad parts 122*ap* are electrically connected to the opposite side of liquid crystal layer, which is an electro-optical layer, through the sealing material, which is a vertical conduction part. By the construction, since it is possible to reduce the area required for arranging the wiring lines in the second substrate 120, the length of the wiring lines 122*a*-2 may be sufficiently secured even when the width of the peripheral region E on the second substrate is not widened. Therefore, since it is possible to provide the outer peripheries of a first insulating layer 125 and a second insulating layer 126, which will be described later, at positions well away from the display region D, the amount of step difference and the inclined angle of a base surface of the wiring lines 122*a*-2 can be decreased. As a result, it is possible to reduce defects caused by the disconnection of the wiring lines 122*a*-2.

In this embodiment, the connecting pad part 122*ap* provided in the vertical conduction part is directly formed on the substrate 121. With this configuration, since the surface become an even surface, it is possible to improve the reliability of electrical connection by the sealing material 131. However, the connecting pad part 122*ap* does not have to be directly formed on the substrate 121. For instance, the connecting pad part 122*ap* may be formed on the first insulating layer 125 or the second insulating layer 126. However, in the case, it is preferable that the connection pad part 122*ap* is provided on any even surface excluding positions immediately above the outer periphery 125*e* of the first insulating layer 125 or the outer periphery 126*e* of the second insulating layer 126.

Internal Construction

Figure 11:
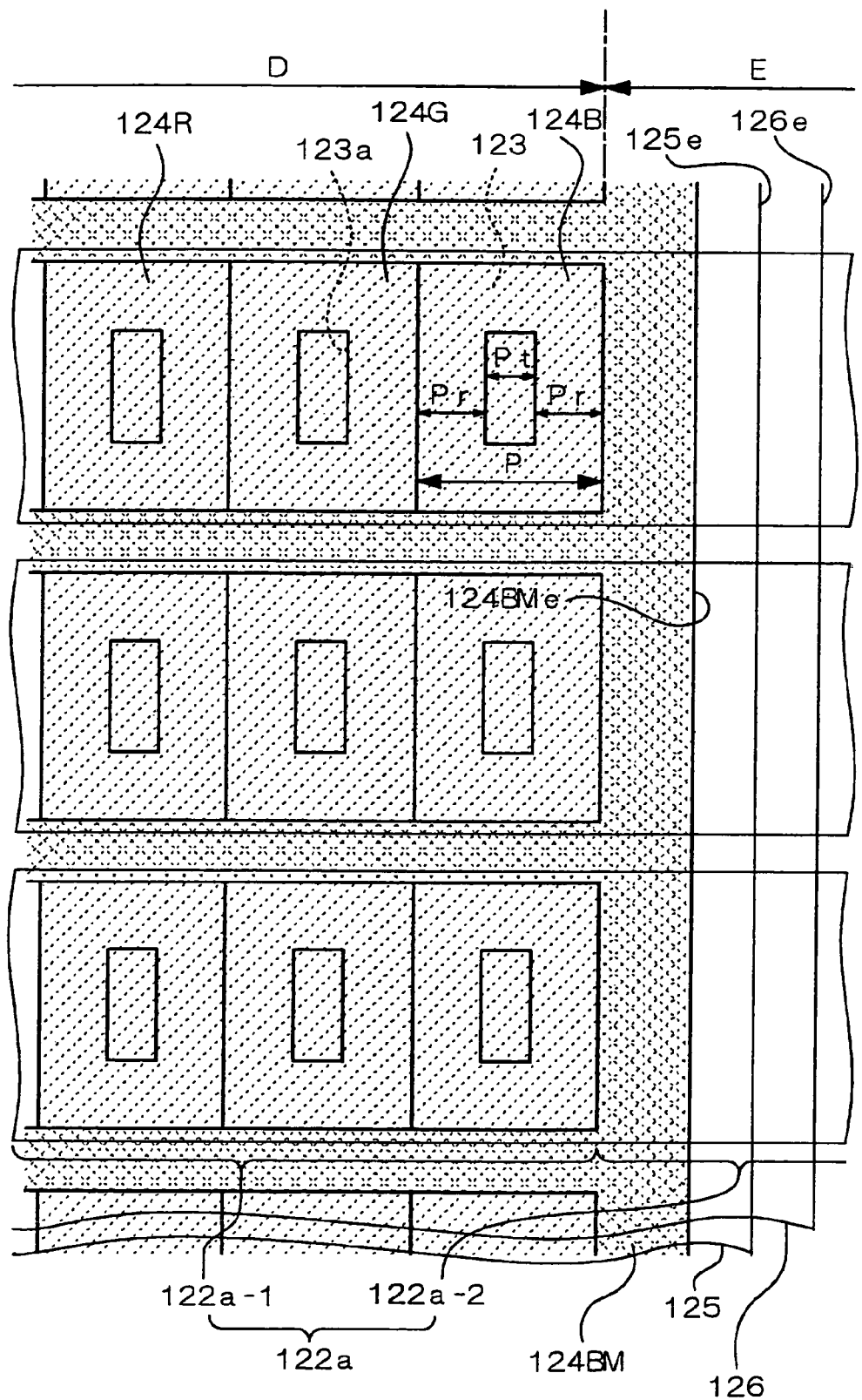
FIG. 11 is a plan view enlarging a part of the second substrate according to the present embodiment.
Figure 12:
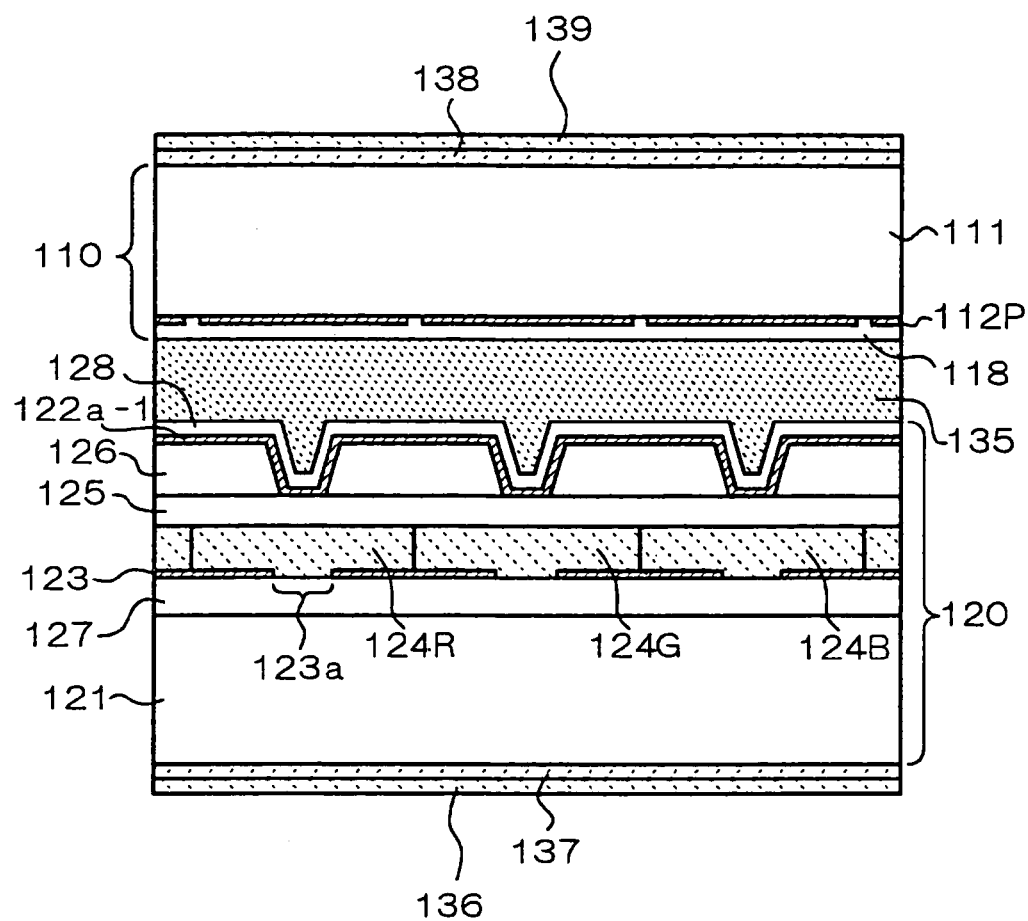
FIG. 12 is a cross-sectional view enlarging a part of a display region in a direction in which wiring lines are extended on the second substrate.
Figure 13:
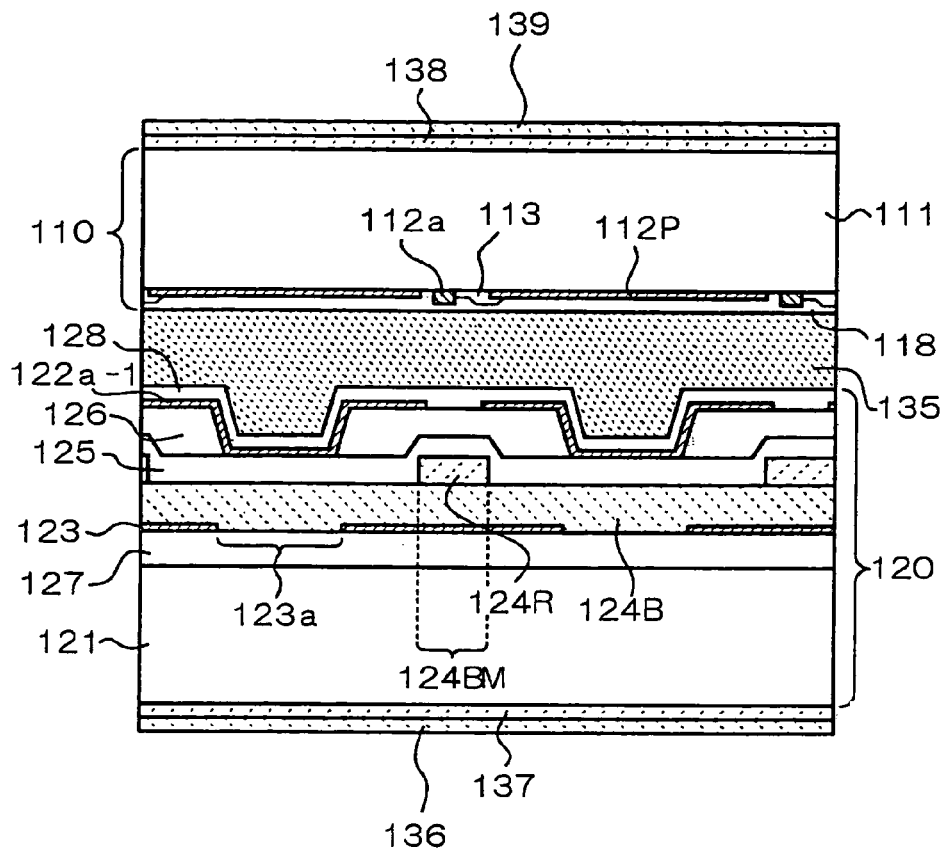
FIG. 13 is a cross-sectional view enlarging a part of the display region in a direction perpendicular to the extending direction of the wiring lines on the second substrate.

Next, with reference to the FIGS. 11 to 13, a substrate for an electro-optical device and the internal construction of the electro-optical device according to the present invention will be explained. FIG. 11 is a plan view enlarging the vicinity of the boundary between the display region D and the peripheral region E on the second substrate 120 of the liquid crystal device 100. FIG. 12 is an enlarged cross-sectional view of a part of the display region D of the liquid crystal device 100, which is taken along the extending direction of the wiring line 122*a*-2. FIG. 13 is an enlarged cross-sectional view of a part of the display region D of the liquid crystal device 100, which is taken along the direction perpendicular to the extending direction of the wiring line 122*a*-2.

In the present embodiment, as illustrated in FIG. 11, a plurality of pixels P is arranged in the display region D in plane view. There are interpixel regions between the pixels P in the display region D, and the light-shielding layer BM, which will be explained later, is provided in the interpixel regions. In addition, the light-shielding layer 124 BM is formed in a portion of the peripheral region E situated along the outer periphery of the display region D so as to surround the display region D.

As illustrated in FIG. 13, in the first substrate 110, the electrode wiring line 112*a* is connected to the pixel electrode 112P through a driving element 113. The driving element 113 and the pixel electrode 112P are formed in each pixel. For example, a TFD (Thin Film Diode Element) with a MIM construction in which conductors are boned to each other through a thin insulating layer interposed therebetween may be used as the driving element 113. For example, the pixel electrode 112P is composed of a transparent conductor, such as ITO. On the electrode wiring line 112*a*, the driving element 113, and the pixel electrode 112P, an alignment film 118 is formed with polyimide resin.

As illustrated FIGS. 12 and 13, the transparent base layer 127 is formed on the substrate 121 of the second substrate 120. Fine unevenness, which is not illustrated in the drawing, is formed on the surface of the transparent base layer 127. The fine unevenness on the surface of the transparent base layer 127, for instance, may be formed with the sequence of processes such as applying a photosensitive resin on the substrate 121, exposing with a predetermined mask for exposure (for instance, proximity exposure), and developing it after exposure. By the uneven surface of the transparent base layer 127, the reflection surface of the reflective layer 123, which will be explained later, becomes a light-diffusive reflection surface. With the construction, the illusion of a background and confusion caused by illuminating light may be prevented by the specular reflection of the reflective layer 123.

The reflective layer 123 is formed on the transparent base layer 127. The reflective layer 123 is formed with metal materials, such as aluminum, an aluminum alloy, and a silver alloy, by an evaporation method or a sputtering method. In the reflective layer as illustrated in the FIG. 11, the opening 123*a* is formed in each pixel P. The light transmission region Pt is constructed in the pixel P by the opening 123*a*. The remaining region other than the light transmission region Pt become a light reflection region Pr. The thickness of the reflective layer is usually about 1000 to 2000 Å.

In the present embodiment, as illustrated in FIGS. 11 to 13, the colored layers 124R, 124G, and 124B are formed on the reflective layer 123 in the display region D. In the illustrated example, the red colored layer 124R, the green colored layer 124G, and the blue colored layer 124B are arranged as shown in FIG. 12. In more detail, any one of the colored layers 124R, 124G, and 124B of red, green, and blue is arranged in each pixel. These colored layers 124R, 124G, and 124B of red, green, and blue are arranged in a predetermined arrangement pattern in the display region D. For example, a stripe arrangement, a delta arrangement, and a tilted mosaic arrangement have been known as the arrangement patterns. The colored layers 124R, 124G, and 124B are respectively formed in order with a method to eliminate a part of the colored layer. The process for manufacturing the colored layers will be explained later in detail.

In addition, the light-shielding layer 124 BM is formed on the reflective layer 123. It is preferable that the light-shielding layer 124B shields the display light emitted to a viewer's direction (the lower direction in FIG. 7 and the upper direction in FIGS. 12 and 13) to a certain extent. For instance, the reflective layer 123 may be formed of a black resin layer or a metal layer subjected to surface treatment (forming an oxide layer). It is preferable that the optical density of the light-shielding layer 124BM be more than 1, and especially more preferable over 1.5. The thickness of the light-shielding layer 124BM is, for example, about 0.5 to 3.0 μm.

It is preferable that the light-shielding layer 124BM be constructed by laminating a plurality of layers with a plurality of colors. In more detail, it is constructed by laminating colored layers with different two colors according to the illustrated drawing. However, it is also preferably constructed by laminating colored layers with all colors (three colors in the illustrated drawing), which are formed in the display region D. The light-shielding layer 124BM is formed in regions between the pixels P as illustrated in FIG. 13. Further, as illustrated in FIG. 11, the light-shielding layer 124BM is formed in the shape of frame along the boundary line between the display region D and the peripheral region E surrounding the display region D. A light-shielding layer 124B formed in the peripheral region E will be explained later.

Also, on the colored layers 124R, 124G, and 124B, and the light-shielding layer 124BM, the first insulating layer 125 is formed. The first insulating layer 124 may be formed of transparent inorganic materials, such as $SiO_2$, $TiO_2$, $Ta_2O_5$ or transparent organic resin materials, such as acryl resin and epoxy resin. The first insulating layer 125 can be formed, for example, by a coating method, a sputtering method, and a CVD method, depending on a material. In the case of the present embodiment, the thickness of the first insulating layer 125 is maintained at approximately constant level in the display region D. Further, the first insulating layer 125 is formed so as to expand from the display region D to the peripheral region E, and further over the light-shielding layer 129 toward the outside. Although the thickness of the first insulating layer 125 is determined considering the balance with insulation characteristics, a thickness of about 0.5 to 2.5 μm is considered to be reasonable because it is possible to have enough insulation property with a thickness of about 0.5 μm in case of constructing with a material, such as acryl resin.

The second insulating layer 126 is formed on the first insulating layer 125. The second insulating layer 126 is formed with the same material and method as described in the explanation of the first insulating layer 125. The second insulating layer 126, as illustrated in FIGS. 12 and 13, is constructed so as to avoid the regions above the openings 123*a*, that is, the light transmission regions Pt. In more detail, the second insulating layer 126 is not formed in the light transmission regions Pt but in the light reflection region Pr. With this construction, approximately flat unevenness is formed in the light transmission region Pt on the second substrate 120. In order to determine the amount of surface step difference in case of the present embodiment, the thickness of the second insulating layer 126 becomes the thickness corresponding to the difference between the thickness required for the liquid crystal layer 135 in the light transmission region Pt and the thickness required for the liquid crystal layer 135 in the light reflective layer Pr. The thickness of the second insulating layer 126 is, for instance, about 1.5 to 3.0 μm.

Next, on the first insulating layer 125 and the second insulating layer 126, the stripe conductor 122*a* composed of a transparent conductive material, such as ITO (Indium Tin Oxide), is formed. The stripe conductor 122*a*, as illustrated in the above explanation, is one element constructed with the electrode 122*a*-1 in the display region D and the wiring line 122*a*-2 in the peripheral region E. The wiring line 122*a*-2 in the peripheral region E extends along the direction away from the display region D. The alignment film 128 is formed of a material, such as polyimide, on the electrode 122*a*-1.

With the construction, the second substrate 120 has an uneven surface, which is lowered by one step, on the light transmission region Pt. Therefore, the liquid crystal layer 135 interposed between the first substrate 110 and the second substrate 120 is constructed to be thicker in the light transmission region Pt and thinner in the light reflection region Pr in each pixel P. That is, a multi-gap type liquid crystal device is constructed. In this case, since the birefringence or the degree of optical rotation (the degree of optical modulation) with respect to light in the liquid crystal layer 135 is the function of retardation $\Delta n \cdot d$ ($\Delta n$ is the reflective index anisotropy of liquid crystal molecules in the liquid crystal layer 135, d is the thickness of the liquid crystal layer 135), with the construction in which the thickness of the liquid crystal layer 135 is to be thicker in the light transmission region Pt and thinner in the light reflection region Pr, it is possible to obtain excellent display quality in both transmissive display and reflective display. That is, in the light transmission region Pt, the light emitted from illuminating means, such as a backlight, which is not illustrated in the drawing, transmits through the liquid crystal layer 135 only once, however, in the light reflection region Pr, incident light from the outside transmits the liquid crystal layer 135 twice. Therefore, in a case in which the thickness of the liquid crystal layer 135 is the same in both the light transmission region Pt and the light reflection region Pr, when any one of both of the transmissive display and the reflective display is optimized, the other is sacrificed to have poor display quality (for instance, such as contrast degradation). However, according to the present embodiment, since the thickness of the liquid crystal layer 135 is to be thicker in the light transmission region Pt and thinner in the light reflection region Pr, the influence caused by difference in the number of times passing-thorough is decreased, and it is possible that the display quality in transmissive display and reflective display is maintained together with high quality.

According to the present embodiment, by arranging the first insulating layer 125 in the entire area of the pixel P, the insulation between the reflective layer 123 and the electrode 122a-1 is secured. Further, by patterning the second insulating layer 126, the second insulating layer 126 does not exist in the light transmission region Pt and exist in the light reflection region Pr, resulting in the uneven shape formed on the second substrate 120. With this configuration, since it is possible that the sag of step difference on the unevenness surface is reduced by patterning the second insulating layer 126 positioned relatively high, and that the shape of the uneven surface is easily controlled. Therefore, there are merits to obtain the desired optical characteristics with high accuracy and yield. For instance, the width of the inclined plane formed in a portion of the step difference part on the boundary between the light transmission region Pt and the light reflection region Pr, in which the alignment of liquid crystal molecules is scattered, should be formed as small as possible within the range that the electrode 122a-1 does not break. The width is conventionally 8 to 10 µm in a horizontal direction. However, according to the present embodiment, it is possible to control the width within the range of about 5 to 7 µm.

Also, as illustrated in FIGS. 12 and 13, in the liquid crystal display 100, a polarizing plate 136 and a phase difference plate 137 are arranged toward the second substrate 120. A phase difference plate 138 and a polarizing plate 139 are arranged toward the viewer's position (the upper side of the illustration) in the outside of the first substrate 110. The polarizing plates 136 and 139 and the phase difference plates 137 and 138 are attached and fixed on the outside of the first substrate 110 and the second substrate 120.

Construction of Color Filter and Manufacturing Method Thereof

Figure 1:
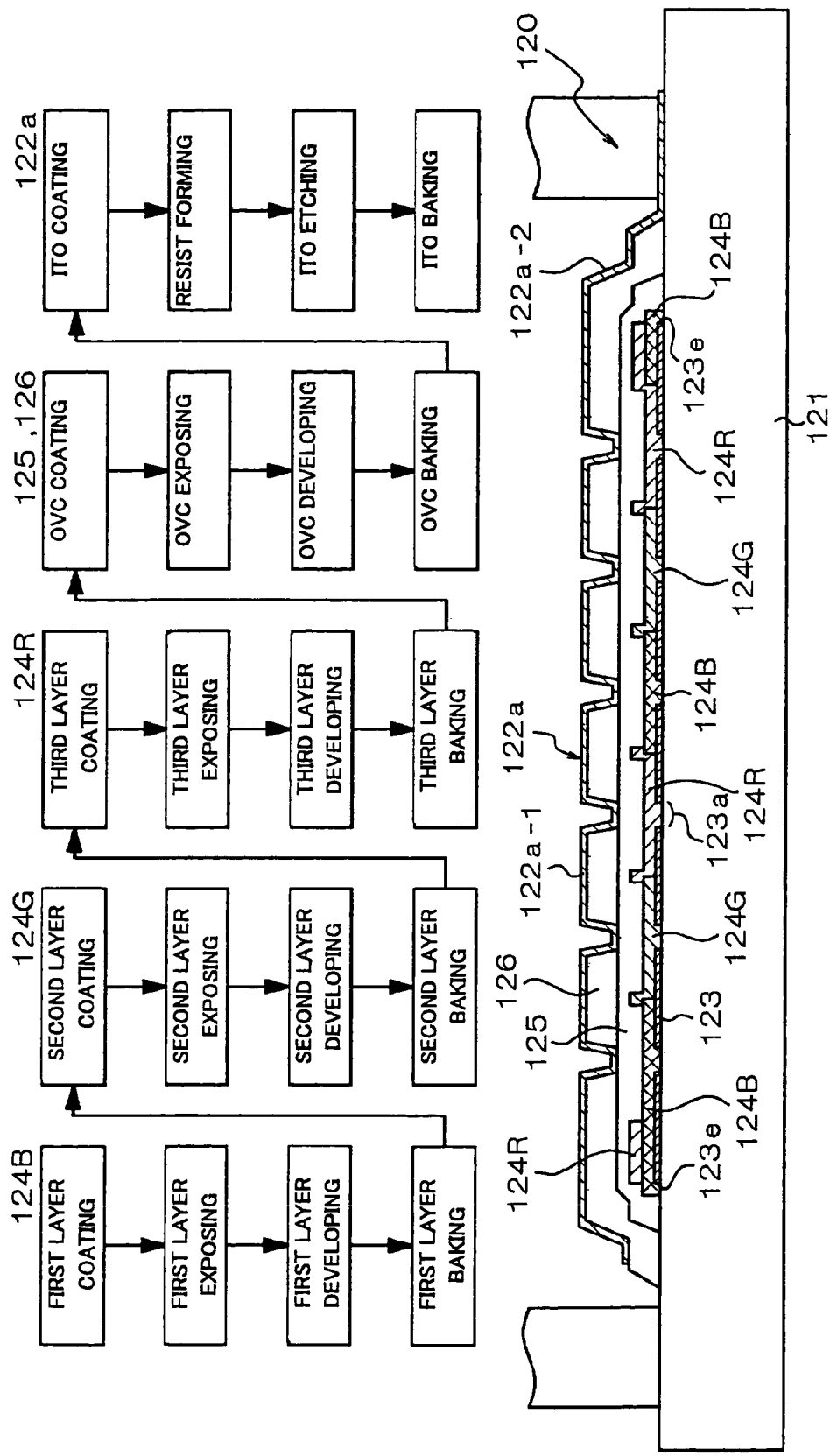
FIG. 1 is a schematic cross-sectional view illustrating the construction of a second substrate according to an embodiment of the present invention, and a schematic flow chart showing a manufacturing process the second substrate.

Next, with reference to FIG. 1, the explanation about the construction and manufacturing method of the colored layers 124R, 124G, and 124B, and the light-shielding layer 124BM formed on the reflective layer 123 will be given. FIG. 1 shows a cross-sectional view schematically illustrating the cross-sectional construction of the second substrate 120 according to the present embodiment and a schematic flow chart illustrating a process for manufacturing the same.

The colored layers 124R, 124G, and 124B are made in the following sequence. Photosensitive resin in which pigment or dye is dispersed is applied by various methods, such as a spin coating method and a roll coating method, and if necessary, a pre-baking process is performed. Next, exposure and development are performed in order, and baking is performed after the development. The pre-baking is performed, for instance, for 10 to 20 minutes at the temperature of 60 to 70° C. Also, in the development, an aqueous alkali solution, such as an aqueous solution of sodium carbonate or calcium hydroxide, is used as a developer.

Further, baking is performed using a clean oven or a hot plate for about 30 to 60 minutes at the temperature of about 150 to 230° C. The processes described above are repeatedly performed in order on each colored layer.

According to the present embodiment, the colored layer 124B is formed first of all. At this time, the colored layer 124B is patterned such that the outer periphery 123e of the reflective layer 123 is fully covered with the colored layer 124B, which is the first layer according to the present invention. Therefore, the outer periphery 123e of the reflective layer is never exposed to the outside after applying the photosensitive resin for the first colored layer 124B.

Further, the colored layers 124R, 124G, and 124B each are formed to usually have a thickness of about 1.0 to 1.5 µm. The thickness of the colored layers is different from each other. The thickness is properly predetermined according to dispersion density, optical characteristics (color dispersion characteristics), and coating characteristics of a colored agent, such as pigment or dye. In this case, it is preferable that the colored layer predetermined to be the thickest among the plurality of colored layers be constructed as the first layer (the colored layer to be formed first, or the colored layer directly formed on the outer periphery 123e of the reflective layer 123). With this construction, it is possible to prevent a developer or an etchant from being permeated, and to raise the protecting efficiency of the first layer for the reflective layer 123.

Thus, the colored layer 124B is formed after completing the sequence of applying, exposing, developing, and baking of a photosensitive resin. Next, as in the colored layer 124B, the colored layer 124G is formed after completing the sequence of coating, exposing, developing, and baking of a photosensitive resin. In the display region D, there are boundary parts of pixels in which the colored layer 124B is already provided. The colored layer 124G is formed such that the circumference of the colored layer 124G is overlapped with the circumference of the colored layer 124B. Next, the colored layer 124R is formed after completing the sequence of coating, exposing, developing, and baking of a photosensitive resin. At this time, in the display region D, boundary parts of pixels in which the colored layers 124B and 124G are already provided exist. The colored layer 124R is formed such that the circumference of the colored layer 124R is overlapped with the circumferences of the colored layers 124B and 124G. Also, at this time, in the vicinity of the outer periphery 123e of the reflective layer 123, the colored layer 124R is laminated on the colored layer 124B, thereby constituting the light-shielding layer 124BM (see FIG. 11).

Next, the first insulating layer 125 and the second insulating layer 126 are formed on the colored layers 124R, 124G, and 124B. Although two insulating layers are formed on the colored layers in the present embodiment, it is also preferable to form only one protective layer. The first insulating layer 125 and the second insulating layer 126, or the protective layer functions as an overcoat (OVC) layer for protecting color filters and an insulating layer between the reflective layer 123 and the electrode 122a-1 and the wiring line 122a-2. In addition, the first insulating layer 125 and the second insulating layer 126, or the protective layer is respectively formed as a transparent insulating layer subjected to the sequence of coating, exposing, developing, and baking of a photosensitive resin.

Next, a transparent conductive material, such as ITO (Indium Tin Oxide), is deposited on the surface by a sputtering method. On the deposited layer, a resist pattern is formed by a photolithography method. By an etching process, the resist pattern is transferred to form the stripe conductors 122a, that is, the electrodes 122a-1, and the wiring lines 122a-2. Finally, the electrodes 122a-1 and the wiring lines 122a-2 are baked. As an example, the baking is performed for about 30 minutes at the temperature of 180 to 230° C.

Figure 2:
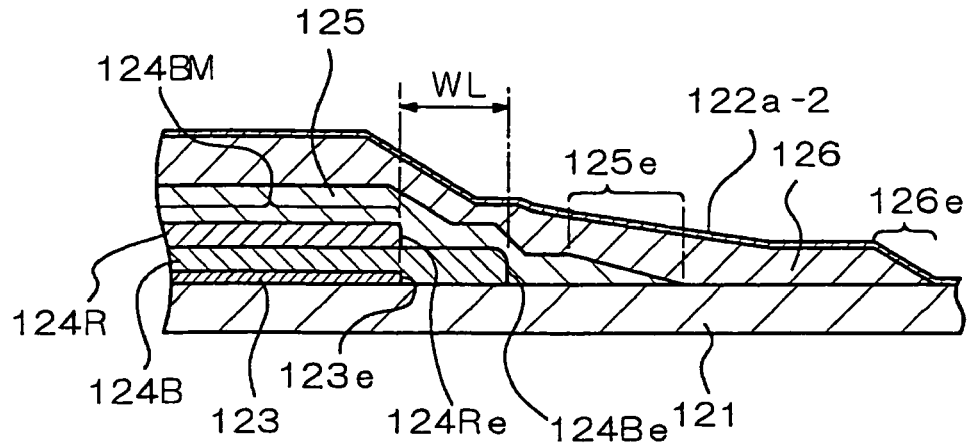
FIG. 2 is an enlarged cross-sectional view illustrating a part of a peripheral region of the second substrate according to the present embodiment.

FIG. 2 is a cross-sectional view enlarging a part (a portion adjacent to the display region D) of the peripheral region E of the second substrate 120. The cross-section is taken along the extending direction of the wiring line 122a-2. Further, the ratio of thickness to length of each layer illustrated in FIG. 2 is very different from the practical proportion, in which the thickness is magnified with respect to length.

As illustrated in FIG. 2, the outer periphery 123e of the reflective layer 123 is covered with the colored layer 124B, which is the first layer forming the light-shielding layer 124BM. By the construction, since it is difficult for a developer to permeate into the outer periphery 123e of the reflective layer 123 when the respective colored layers including the colored layer 124B itself are developed, it is difficult for the outer periphery 123e to be peeled from the substrate 121. Therefore, since it is difficult for the outer periphery 123e of the reflective layer 123 to bend or lift when each colored layer is baked, it is difficult for the wiring lines 122a-2 formed on the upper layer to be broken by the lifting of the outer periphery 123e of the reflective layer 123.

Here, the outer periphery 124Be of the colored layer 124B, which is the first layer, extends, as much as a width WL, toward the outside (the estranged side from the display region D) over the outer periphery 123e of the reflective layer 123. It is preferable that the width be over 1 μm to decrease the damage caused by the developer or etchant on the outer periphery 123e of the reflective layer 123, which will be explained later. Further, if the width WL is extended too long, the width of the peripheral region E also needs to be longer. Therefore, it is preferable that the width WL be within the range of 1 to 10 μm. Furthermore, in case of considering the irregularity of patterning uniformity, it is preferable that the width WL be in the range of about 3 to 8 μm.

In addition, according to the construction, in the light-shielding layer 124BM, the outer periphery 124Be of the colored layer 124B and the outer periphery 124Re of the colored layer 124R that is laminated on the colored layer 124B are formed at different positions as seen from the extending direction of the wiring line 122a-2. By the construction, since the amount of step difference or the inclined angle of the surface of the protective layer (the first insulating layer 125 and the second insulating layer 126) is decreased, it is possible to prevent the wiring line 122a-2 formed on the protective layer from breaking due to the insufficient coverage of the protective layer. This effect can be further improved by forming the outer periphery 125e of the first insulating layer 125 and the outer periphery 126e of the second insulating layer 126 at different positions as seen from the extending direction of the wiring line 122a-2. Further, according to the present embodiment, the outer peripheries 124Be and 124Re of the light-shielding layer 124, and the outer peripheries 125e and 126e, which are referred to above, are formed at different positions as seen from the extending direction. By this construction, the above effect can be further promoted.

Figure 3:
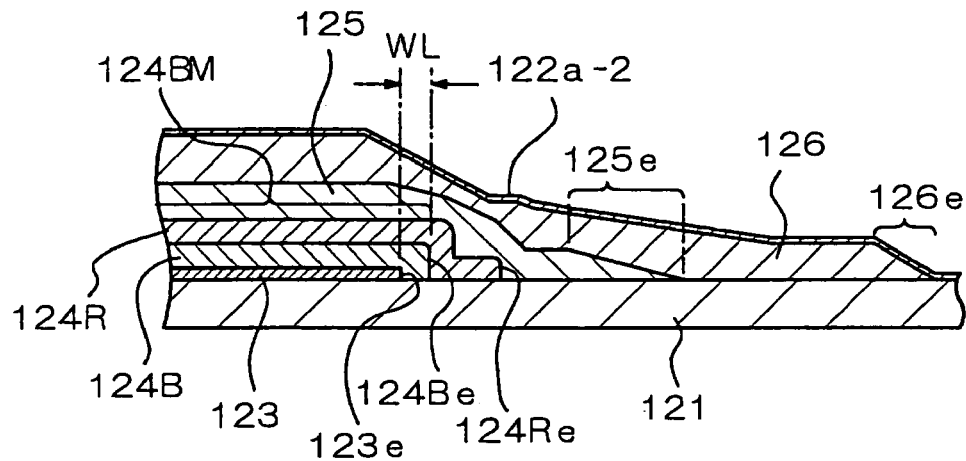
FIG. 3 is an enlarged cross-sectional view illustrating a part of the peripheral region of a second substrate according to another embodiment.

FIG. 3 illustrates a construction in which the outer periphery 124Re of the colored layer 124R, which is provided on the outer periphery 124Be of the colored layer 124B as the first layer, is formed outside (the estranged side from the display region D) over the outer periphery 124Be. Furthermore, in the present construction, the colored layer 124B, which is the first layer, completely covers the outer periphery 123e of the reflective layer 123. In addition, the width WL is the same as described in the above. However, according to the present embodiment, since the colored layer 124R covers, further, the outer periphery 124Be of the colored layer 124B, which is the first layer, damage to the reflective layer 123 is decreased more.

Figure 4:
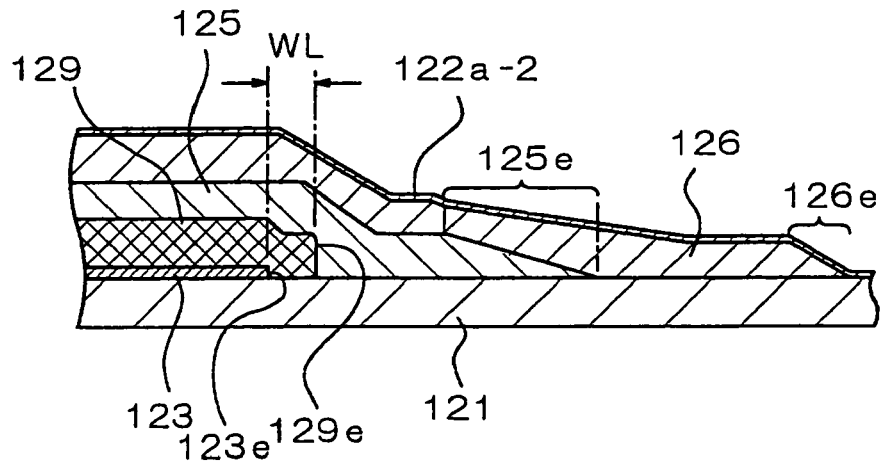
FIG. 4 is an enlarged cross-sectional view illustrating a part of the peripheral region of a second substrate according to still another embodiment.

FIG. 4 shows a construction of the light-shielding layer 129, which is made of a material, such as black resin, and is separately formed from the colored layer, instead of the light-shielding layer 124BM formed by laminating the colored layers. In this case, the light-shielding layer 129 is initially formed on the substrate 121 before forming the colored layer. At this stage, the light-shielding layer 129 becomes the first layer, which covers the outer periphery 123e of the reflective layer 123. Further, in this configuration, the distance between the outer periphery 123e of the reflective layer 123 and the outer periphery 129e of the reflective layer 129 that is provided outside the outer periphery 123e, that is, the width WL, is the same as described above.

Figure 5:
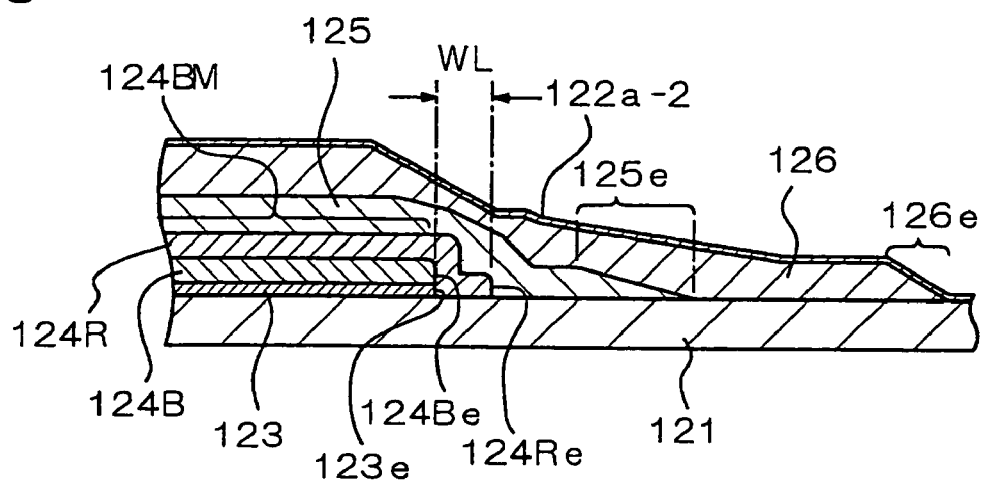
FIG. 5 is an enlarged cross-sectional view illustrating a part of the peripheral region of a second substrate according to still another embodiment.

FIG. 5 shows a construction of the light-shielding layer 124BM formed by laminating a plurality of the colored layers 124B and 124R. However, in the FIG. 5, among the colored layers 124B and 124R constituting the light-shielding layer 124BM, the outer periphery 123e of the reflective layer 123 is covered with the colored layer 124R, which is formed next to the colored layer 124B, which is initially formed. In this configuration, the light-shielding layer 124BM is a complex layer in which each of the laminated colored layers does not play an independent role, and a predetermined function (a light-shielding function) can be manifested for the first time after laminating. Although the outer periphery 124Be of the colored layer 124B is placed on the outer periphery 123e of the reflective layer 123 or in the extreme vicinity of the outer periphery 123e, the colored layer 124B does not completely cover the outer periphery 123e of the reflective layer 123. On the other hand, the outer periphery 124Re of the colored layer 124R is arranged outside the outer periphery 123e of the reflective layer 123, and the colored layer 124R covers the outer periphery 123e of the reflective layer 123. In this configuration, when the colored layer 124B, which is initially formed, is patterned, the outer periphery 123e of the reflective layer 123 is exposed. Therefore, the outer periphery 123e is also revealed during the patterning process. However, the outer periphery 123e is covered by the colored layer 124R that is formed after patterning. Thus, the outer periphery 123e is finally protected by the colored layer 124R as in the same manner as described above thereafter.

Figure 6:
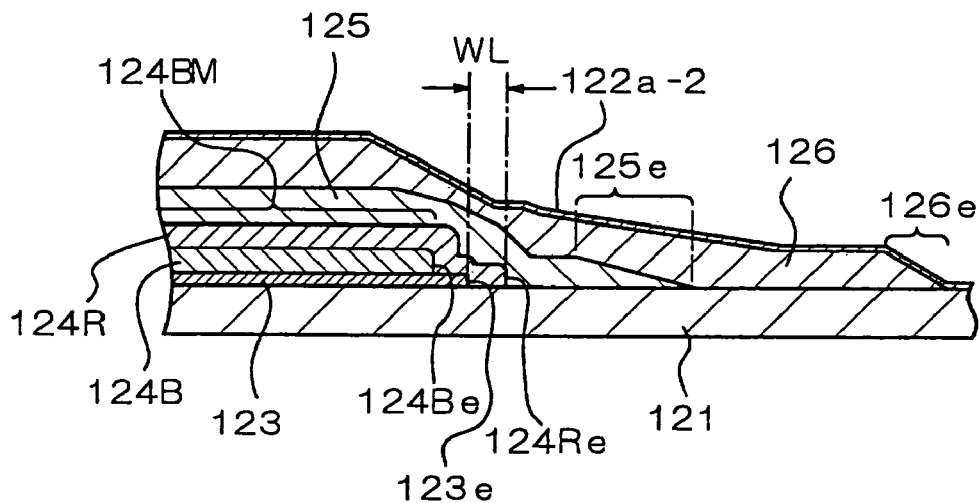
FIG. 6 is an enlarged cross-sectional view illustrating a part of the peripheral region of a second substrate according to still another embodiment.

FIG. 6, as in FIG. 5, shows the construction of the light-shielding layer 124BM formed by laminating a plurality of the colored layers 124B and 124R. However, in the FIG. 6, of the colored layers 124B and 124R constituting the light-shielding layer 124BM, the outer periphery 123e of the reflective layer 123 is covered by the colored layer 124R formed next to the colored layer 124B initially formed. In this configuration, the outer periphery 124Be of the colored layer 124B is placed inside the outer periphery 123e of the reflective layer 123. That is, the outer periphery 123e of the reflective layer 123 is extended and placed outside the outer periphery 124Be of the colored layer 124B, which is initially formed on the reflective layer 123. In addition, the outer periphery 124Re of the colored layer 124R, which is formed on the colored layer 124B, is arranged outside the outer periphery 123e of the reflective layer 123, and the colored layer 124R covers the outer periphery 123e of the reflective layer 123. In this configuration, as in the same manner as described above, when the colored layer 124B, which is initially formed, is patterned, the outer periphery 123e of the reflective layer 123 is revealed. Therefore, the outer periphery 123e is revealed during the patterning process. However, the outer periphery 123e is covered by the colored layer 124R, which is formed after patterning. Thus, the outer periphery 123e is finally protected by the colored layer 124R as in the same manner as described above.

In any one of the constructions illustrated in FIG. 3, FIG. 5, and FIG. 6, the outer periphery 123e of the reflective layer 123 is covered by the light-shielding layer 124BM. Further, in these configurations, among the plurality of layers 124B, 124R, 124, and 126, which are formed on the reflective layer 123, the outer periphery 124Be of the colored layer 124B, which is initially formed, is placed innermost. In this case, because of a positional deviation caused by tolerance in patterning the outer periphery 124Be of the colored layer 124B, it is difficult to predict which one among the above three constructions is applied, and the positional relationship between the outer periphery 123e and the outer periphery 124Be is not controllable at times. Even in case of the uncontrollable situation, the outer periphery 123e of the reflective layer 123 is covered without exception by any one of the layers constituting the light-shielding layer 124BM. For instance, in comparison with a case in which the outer periphery 123e of the reflective layer 123 is covered by a layer, which is formed after forming the light-shielding layer 124B, a possibility that the reflective layer 123 will be peeled off is considerably decreased.

In each configuration of the present embodiment, since the outer periphery 123e of the reflective layer 123 is covered by the colored layer 124B, which is the first layer, it is difficult for a developer or an etchant to permeate into the outer periphery 123e, and to peel from the substrate 121. As a result, it becomes difficult for the outer periphery 123e to lift, for example, in a subsequent heating process. Therefore, a serious defect, such as the disconnection of the wiring line 122a-2 formed on the upper layer, become difficult to happen, and the yield of products increases.

Further, in each configuration of the present embodiment, although the first insulating layer 125 and the second insulating layer 126 are formed on the colored layers 124R, 124G, and 124B, and the light-shielding layer 124BM (or the light-shielding layer 129), it is also preferable to form only one protective layer. In addition, it is possible to remove the protective layer itself.

Furthermore, in the present embodiment, the first insulating layer 125 is formed in the entire area of the display region D, and the second insulating layer 126 is constructed so as not to partially exist in the display region D. With this configuration, an uneven surface, in which the light transmission region Pt is lowered, is formed on the second substrate 120. However, the present invention is not limited to the embodiments. For instance, it is also preferable that the first insulating layer 125 be constructed so as not to partially exist in the display region D to form the uneven surface of the first substrate 120, and that the second insulating layer 126 be formed thereon in the entire area to prevent electrical leakage between the light reflective layer 123 and the electrode 122a-1. Further, it is preferable that both of the first insulating layer 125 and the second insulating layer 126 be constructed so as not to partially exist in the display region D to form an uneven surface. In this case, if at least one of the first insulating layer 125 and the second insulating layer 126 is interposed between the reflective layer 123 and the electrode 122a-1 (if a region in which the first insulating layer 125 is not formed does not overlap with a region in which the second insulating layer 126 is not formed in plan view), it is possible to prevent electrical leakage, thereby avoiding the deterioration of display quality.

Further, although the present embodiment intends to control the defects on the reflective layer 123 by protecting the outer periphery 123e of the reflective layer 123, the present invention is not limited to the reflective layer. In addition, the present invention can be applied to a variety of metal layers that are constructed in electro-optical devices or are formed on the substrates. For instance, as metal layers other than the reflective layer, light-shielding layers formed with a variety of metal materials (including alloys), such as Ta, Cr, and Ni, can be enumerated as examples. Further, as metal materials to constitute metal layers, Au, Ag, Cu, Ti, W, Fe, and alloys thereof can be enumerated as examples in addition to the Al, Ta, Cr, and Ni.

In particular, it is most preferable for the first layer (the colored layer 124B, the light-shielding layer 124BM, or the light-shielding layer 129) to completely cover the entire outer periphery of the metal layer (the reflective layer 123). It is possible to have an effect on the covered part if the first layer partially covers the outer periphery of the metal layer. However, if the first layer completely covers the entire outer periphery of the metal layer, the first layer becomes to cover the entire outer periphery of the metal layer at once. As a result, it is possible to more reliably prevent defects caused by the metal layer.

Electronic Apparatus

Figure 14:
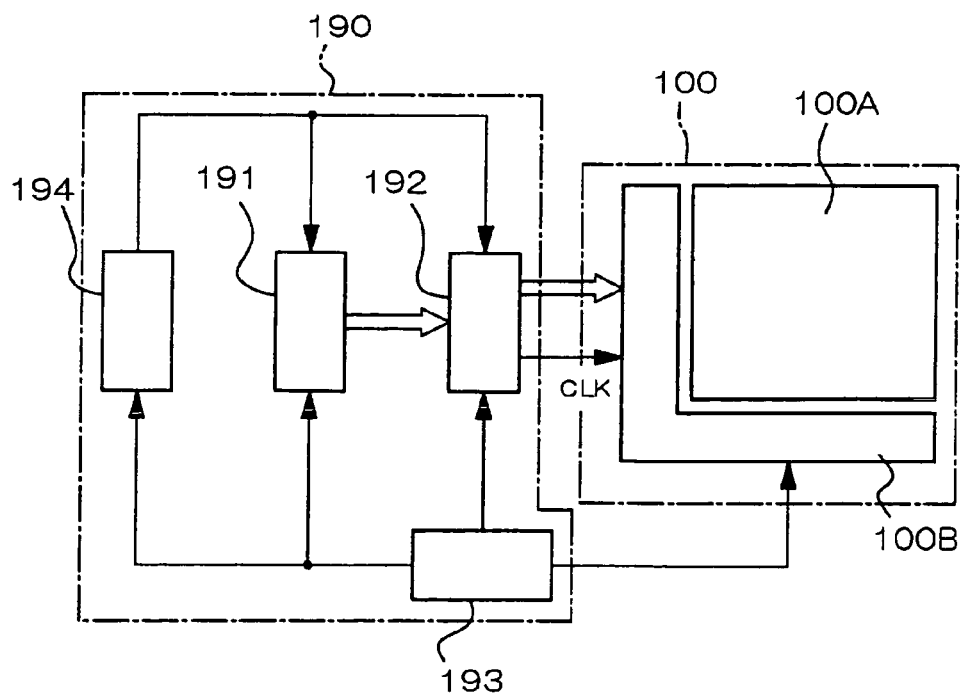
FIG. 14 is a schematic diagram illustrating an electro-optical device and control means therefore, which are mounted on an electronic apparatus.

Finally, with reference to FIGS. 14 and 15, an embodiment of an electronic apparatus according to the present invention will be explained. In the present embodiment, an explanation will be given about an electronic apparatus having the electro-optical device (the liquid crystal device 100) as display means. FIG. 14 is a schematic diagram illustrating the entire construction of a control system (display control system) for the liquid crystal device 100 in the electronic apparatus according to the present embodiment. The electronic apparatus illustrated in this figure has a display control circuit 190 comprising a display information output source 191, a display information processing circuit 192, a power circuit 193, and a timing generator 194. Further, the liquid crystal device 100 is provided with a driving circuit 100B for driving a liquid crystal panel 100A. The driving circuit 100B comprises electronic parts (semiconductor IC chips) 132 and 133 that are directly mounted on the liquid crystal panel 100A as described above. However, the driving circuit 100B, in addition to the type as described above, may comprise circuit patterns formed on the panel surface, or IC chips or circuit patterns mounted on a circuit board that is electrically connected to a liquid crystal panel.

The display information output source 191 comprises a memory, such as a ROM (Read Only Memory) or a RAM (Random Access Memory), a storage unit, such as a magnetic recording disk or an optical recording disk, and a tuning circuit for tuning and outputting digital image signals, and supplies display information to the display information processing circuit 192 in the form of image signals having a predetermined format based on a variety of clock signals generated by the timing generator 194.

The display information processing circuit 192 comprises a variety of well-known circuits, such as a serial-to-parallel conversion circuit, an amplifying and reversing circuit, a rotation circuit, a gamma correction circuit, and a clamp circuit, and processes input display data to supply it to the driving circuit 100B together with clock signals CLK. The driving circuit 100B includes a scanning line driving circuit, a signal line driving circuit, and a test circuit. Further, the power circuit 193 supplies a predetermined voltage to the respective elements.

Figure 15:
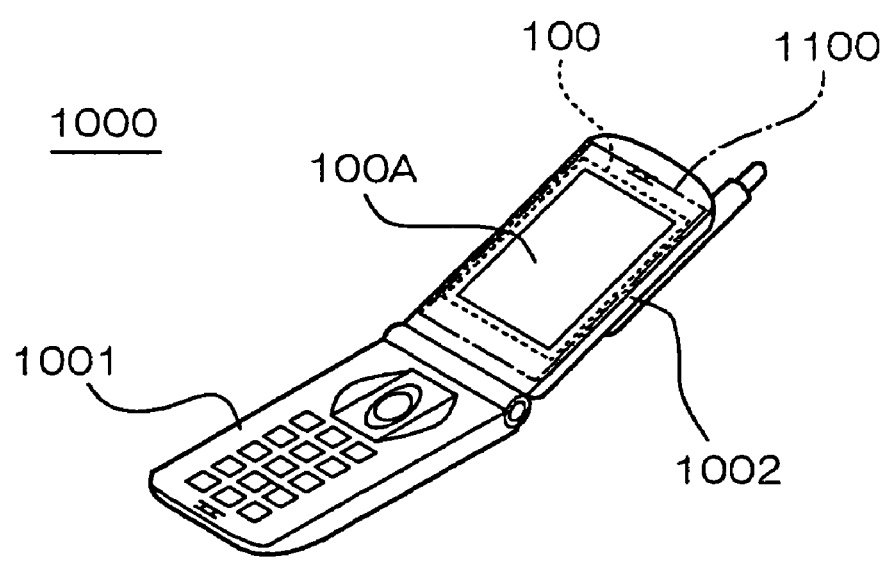
FIG. 15 is a schematic perspective view illustrating an example of the electronic apparatus.
Figure 16:
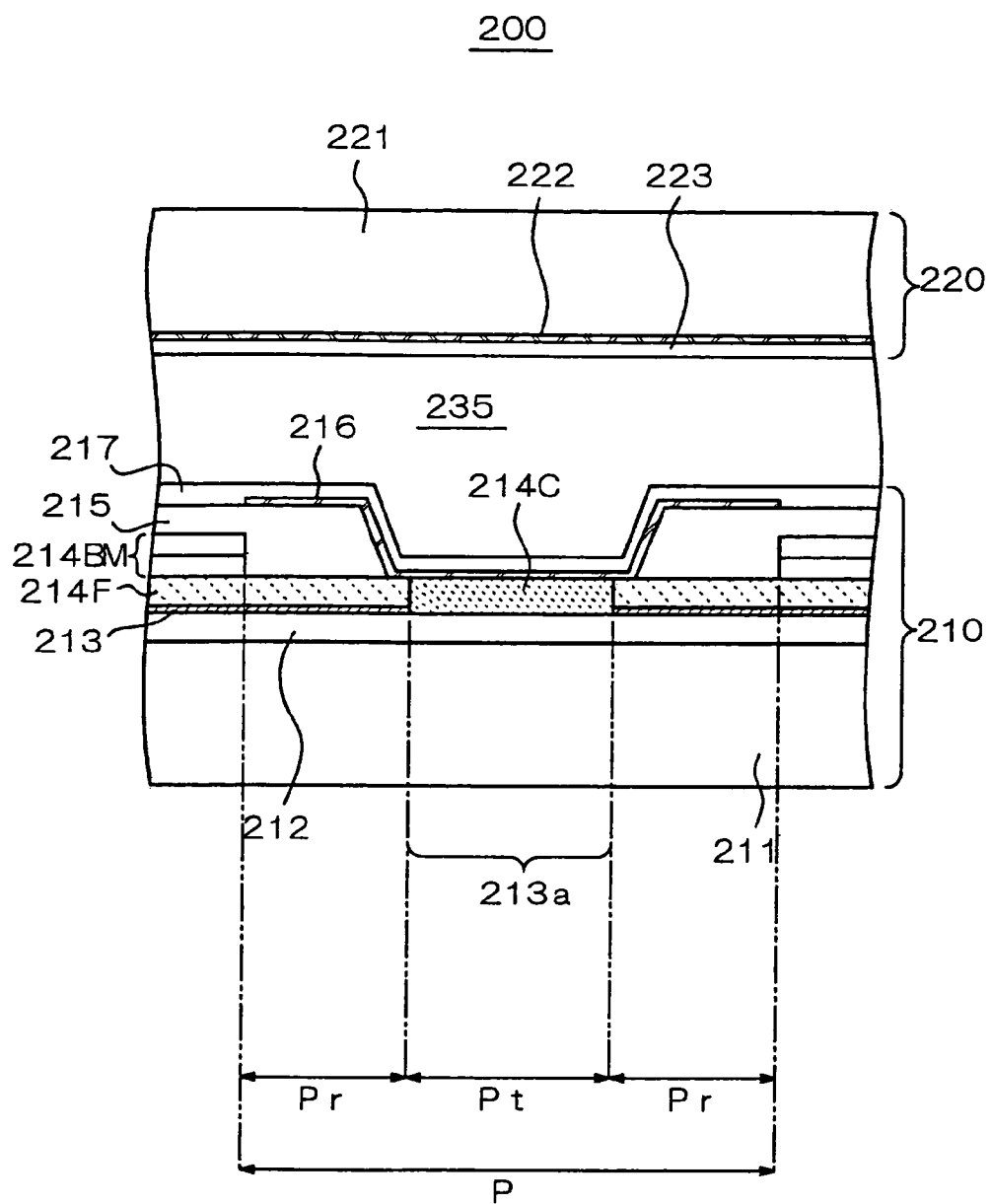
FIG. 16 is a cross-sectional view enlarging the construction of a transflective liquid crystal display device according to the present invention.
Figure 17A:
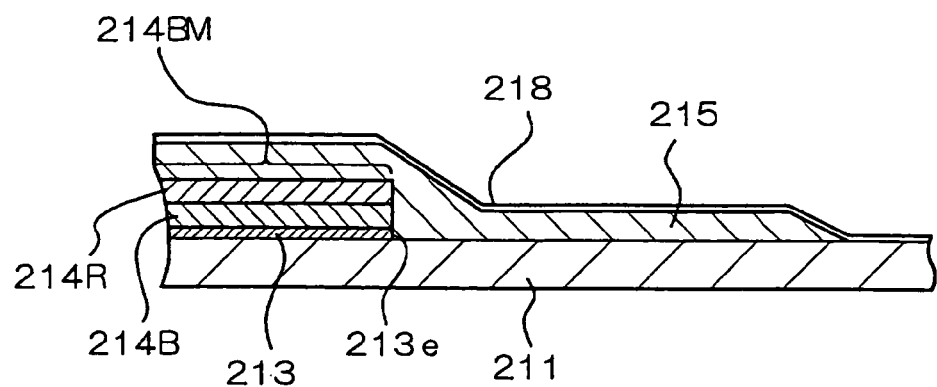
FIGS. 17(a) and (b) are cross-sectional views enlarging a part of the peripheral region of a first substrate for a liquid crystal display device according to the present invention.
Figure 17B:
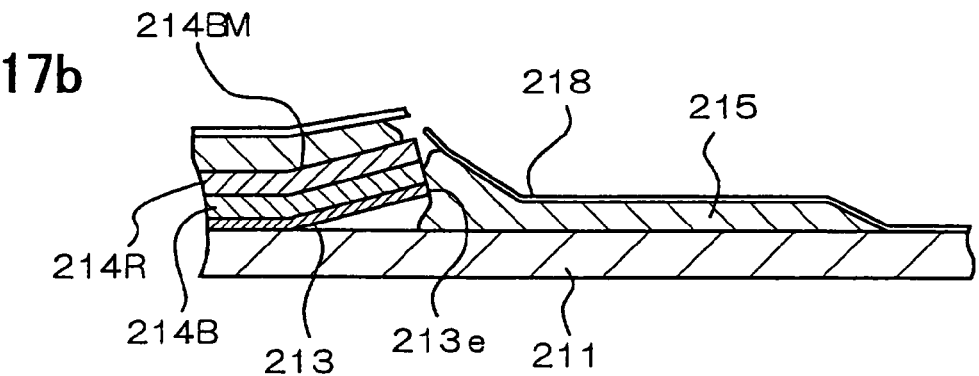

FIG. 15 shows the appearance of a mobile phone as an embodiment of the electronic apparatus according to the present invention. An electronic apparatus 1000 comprises an operating unit 1001 and a display unit 1002, and a circuit board 1100 is provided in the internal side of the display unit 1002. The liquid crystal display 100 is mounted on the circuit board 1100. The liquid crystal panel 100A can be seen through the surface of the display unit 1002.

The liquid crystal device 100 according to the present embodiment is especially effective when it is mounted on a portable electronic apparatus as described above since it is possible to adopt transmissive display or reflective display according to situations as described above.

What is claimed is:

1. A substrate for an electro-optical device comprising:
    a metal layer provided over a substrate;
    a plurality of layers laminated over the metal layer;
    a first layer initially formed in the plurality of layers, the first layer covering an outer periphery of the metal layer and extending beyond the outer periphery of the metal layer by a first distance;
    a first insulating layer laminated over the plurality of layers, the first insulating layer covering an outer periphery of the first layer and extending beyond the outer periphery of the first layer by a second distance; and
    a second insulating layer laminated over the first insulating layer, the second insulating layer covering an outer periphery of the first insulating layer and extending beyond the outer periphery of the first insulating layer by a third distance,
    wherein the plurality of layers are formed so that the outer periphery of the first layer is arranged most outside in the plurality of layers;
    the second distance is longer than the first distance and the third distance is longer than the second distance; and
    the first layer is colored.

2. The substrate for the electro-optical device according to claim 1,
    wherein the outer periphery of the first layer is extends at least 1 μm beyond the outer periphery of the metal layer.

3. The substrate for the electro-optical device according to claim 1,
    wherein the plurality of layers further comprises a plurality of colored layers including a plurality of colors.

4. The substrate for the electro-optical device according to claim 1,
    wherein the first layer constitutes a light-shielding layer which is formed over the outer periphery of the metal layer for shielding light.

5. The substrate for the electro-optical device according to claim 4,
    wherein the light-shielding layer comprises a second layer formed on the first layer, and
    wherein an outer periphery position of the first layer and an outer periphery position of the second layer are different from each other.

6. The substrate for the electro-optical device according to claim 4, further comprising:
    a display region in which a plurality of pixels is arranged; and
    a peripheral region arranged outboard of the display region,
    wherein the outer periphery of the metal layer and the light-shielding layer are provided in the peripheral region, and wiring lines are arranged above the light-shielding layer.

7. A substrate for an electro-optical device comprising:
    a metal layer provided over a substrate;
    a colored layer laminated directly on the metal layer, the colored layer covering an outer periphery of the metal layer and extending beyond the outer periphery of the metal layer by a first distance;
    a first insulating layer laminated over the colored layer, the first insulating layer covering an outer periphery of the colored layer and extending beyond the outer periphery of the colored layer by a second distance; and
    a second insulating layer laminated over the first insulating layer, the second insulating layer covering an outer periphery of the first insulating layer and extending beyond the outer periphery of the first insulating layer by a third distance.
    wherein the second distance is longer than the first distance and the third distance is longer than the second distance.

8. The substrate for the electro-optical device according to claim 7,
    wherein the colored layer is formed with black resin.

9. An electro-optical device, comprising:
    an electro-optical layer provided over a substrate;
    a pair of electrodes facing each other with the electro-optical layer interposed therebetween;
    a metal layer and a plurality of layers laminated over the metal layer which are arranged over the electro-optical layer side of the substrate;
    a first layer initially formed in the plurality of layers, the first layer covering an outer periphery of the metal layer and extending beyond the outer periphery of the metal layer by a first distance;
    a first insulating layer laminated over the plurality of layers, the first insulating layer covering an outer periphery of the first layer and extending beyond the outer periphery of the first layer by a second distance; and
    a second insulating layer laminated over the first insulating layer, the second insulating layer covering an outer periphery of the first insulating layer and extending beyond the outer periphery of the first insulating layer by a third distance,
    wherein the plurality of layers are formed so that the outer periphery of the first layer is arranged most outside in the plurality of layers;
    the second distance is longer than the first distance and the third distance is longer than the second distance; and
    the first layer is colored.

10. The electro-optical device according to claim 9, wherein the plurality of layers further comprise a plurality of color filters including a plurality of colored layers.

11. The electro-optical device according to claim 9, further comprising:
    a display region in which a plurality of pixels are arranged; and
    a peripheral region arranged outboard of the display region;
    wherein the outer periphery of the metal layer and the first layer are provided at the peripheral region, and
    wherein the first layer constitutes a light-shielding layer which is formed on the outer periphery of the metal layer for shielding light.

12. The electro-optical device according to claim 11,
wherein the light-shielding layer comprises a second layer formed on the first layer, and
wherein an outer periphery position of the first layer and an outer periphery position of the second layer are different from each other.

13. An electronic apparatus comprising the electro-optical device according to claim 9 and a control system for the electro-optical device.

14. An electro-optical device, comprising:
an electro-optical layer provided over a substrate;
a pair of electrodes facing each other with the electro-optical layer interposed therebetween;
a metal layer and a plurality of layers laminated over the metal layer which are arranged over the electro-optical layer side of the substrate;
a first layer of the plurality of layers directly formed on the metal layer, the first layer covering an outer periphery of the metal layer and extending beyond the outer periphery of the metal layer by a first distance;
a first insulating layer laminated over the plurality of layers, the first insulating layer covering an outer periphery of the first layer and extending beyond the outer periphery of the first layer by a second distance; and
a second insulating layer laminated over the first insulating layer, the second insulating layer covering an outer periphery of the first insulating layer and extending beyond the outer periphery of the first insulating layer by a third distance,
wherein the second distance is longer than the first distance and the third distance is longer than the second distance; and
the first layer is colored.

15. An electro-optical device comprising:
an electro-optical layer provided over a substrate;
a pair of electrodes facing each other with the electro-optical layer interposed therebetween;
a color filter composed of a plurality of colored layers laminated over a metal layer which are arranged over the electro-optical layer side of the substrate, a first colored layer of the plurality of colored layers covering an outer periphery of the metal layer and extending beyond the outer periphery of the metal layer by a first distance;
a first insulating layer laminated over the plurality of colored layers, the first insulating layer covering an outer periphery of the first colored layer and extending beyond the outer periphery of the first colored layer by a second distance; and
a second insulating layer laminated over the first insulating layer, the second insulating layer covering an outer periphery of the first insulating layer and extending beyond the outer periphery of the first insulating layer by a third distance;
wherein the plurality of colored layers are formed so that the outer periphery of the first colored layer is arranged most outside in the plurality of colored layers; and
the second distance is longer than the first distance and the third distance is longer than the second distance.

16. An electro-optical device comprising:
a substrate:
a metal layer provided over the substrate;
a plurality of layers laminated over the metal layer;
a first layer initially formed in the plurality of layers, the first layer covering an outer periphery of the metal layer and extending beyond the outer periphery of the metal layer by a first distance;
a first insulating layer laminated over the plurality of layers, the first insulating layer covering an outer periphery of the first layer and extending beyond the outer periphery of the first layer by a second distance; and
a second insulating layer laminated over the first insulating layer, the second insulating layer covering an outer periphery of the first insulating layer and extending beyond the outer periphery of the first insulating layer by a third distance;
wherein the plurality of layers are formed so that the outer periphery of the first layer is arranged most outside in the plurality of layers; and
the second distance is longer than the first distance and the third distance is longer that the second distance.

17. An electro-optical device comprising:
a substrate;
a metal layer provided over the substrate;
a plurality of layers laminated over the metal layer;
a first layer of the plurality of layers laminated directly on the metal layer, the first layer covering an outer periphery of the metal layer and extending beyond the outer periphery of the metal layer by a first distance;
a first insulating layer laminated over the plurality of layers, the first insulating layer covering an outer periphery of the first layer and extending beyond the outer periphery of the first layer by a second distance; and
a second insulating layer laminated over the first insulating layer, the second insulating layer covering an outer periphery of the first insulating layer and extending beyond the outer periphery of the first insulating layer by a third distance;
wherein the plurality of layers are formed so that the outer periphery of the first layer is arranged most outside in the plurality of layers; and
the second distance is longer than the first distance and the third distance is longer than the second distance.

18. An electro-optical device comprising:
a substrate:
a metal layer provided over the substrate:
a color filter composed of a plurality of colored layers laminated over the metal layer, a first colored layer of the plurality of colored layers covering an outer periphery of the metal layer and extending beyond the periphery of the metal layer by a first distance;
a first insulating layer laminated over the plurality of colored layers, the first insulating layer covering an outer periphery of the first colored layer and extending beyond the outer periphery of the first colored layer by a second distance; and
a second insulating layer laminated over the first insulating layer, the second insulating layer covering an outer periphery of the first insulating layer and extending beyond the outer periphery of the first insulating layer by a third distance;
wherein the plurality of colored layers are formed so that the outer periphery of the first colored layer is arranged most outside in the plurality of colored layers; and
the second distance is longer than the first distance and the third distance is longer than the second distance.

* * * * *